W. S. HELTZEN.
DIAPHRAGM CONSTRUCTION.
APPLICATION FILED MAY 19, 1910.
984,915.
Patented Feb. 21, 1911.
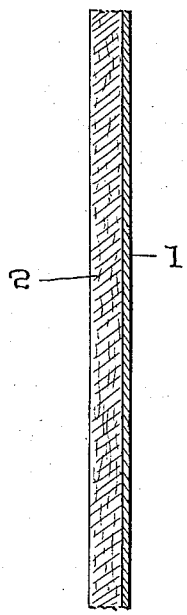
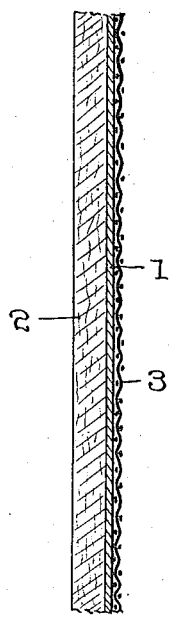
Witnesses
Thos. W. Riley
B. D. Christie
Inventor
W. S. Heltzen
By W. J. Fitzgerald & Co
Attorneys

UNITED STATES PATENT OFFICE.

WILLIAM S. HELTZEN, OF DAVIS, WEST VIRGINIA.

DIAPHRAGM CONSTRUCTION.

984,915.

Specification of Letters Patent. Patented Feb. 21, 1911.

Application filed May 19, 1910. Serial No. 562,532.

*To all whom it may concern:*

Be it known that I, WILLIAM STANLEY HELTZEN, a citizen of the United States, residing at Davis, in the county of Tucker and State of West Virginia, have invented certain new and useful Improvements in Diaphragm Constructions; and I do hereby declare the following to be a full, clear, and exact description of the invention, such as will enable others skilled in the art to which it appertains to make and use the same.

My invention relates to new and useful improvements in diaphragm constructions and more particularly to that class adapted to be used in connection with cathodes and my object is to provide a suitable composition of matter, which will be impervious to liquids and at the same time permit soda or the like to pass therethrough, as when the device is used in conjunction with an electrolytic cell.

A further object is to provide a body for the composition, whereby it may be readily applied over the usual form of wire gauze or the like, said wire gauze being used as an electrode, and, A further object is to pass said composition through a certain process of preparation before applying the same to use.

Other objects and advantages will be hereinafter referred to and more particularly pointed out in the specification and claims.

In the accompanying drawings, which are made a part of this application, Figure 1 is a sectional view through the diaphragm before being applied to use, and, Fig. 2 is a similar view, showing the diaphragm in position on the wire gauze.

In carrying out my invention, a composition is formed of a mixture of cement, lime and ground asbestos fiber, which composition is placed upon any suitable form of cloth, but preferably comprising asbestos cloth. In applying the product upon the cloth, the lime, cement and ground asbestos are brought to a plastic state before being applied to the cloth, said cloth before having the composition applied thereto being stretched upon a tank of suitable size, which tank is preferably filled with water. After a cloth 1 has been stretched over the tank, the plastic solution 2 is placed thereover and the water then withdrawn from the tank, the suction caused by the water leaving the tank drawing the liquid or water within the composition into the tank, the pressure of the air as it passes through the pores of the composition forcing the water or liquid therefrom. This action will also cause the solution or composition to adhere to the asbestos cloth. The diaphragm thus produced is removed from the tank and placed in a heated oven and remains therein for a number of hours or until the diaphragm is properly dried. The diaphragm is then immersed in a solution of silicate of soda, which acts as a binding agent. After retaining the diaphragm in this solution for several days, or until properly hardened, it is placed in tanks containing water of sufficient depth to immerse the same until such time as they are to be applied to use, the immersion of the diaphragm in the water keeping the same sufficiently pliable to prevent cracking or disintegration of the composition when the diaphragm is being handled or placed in engagement with the wire gauze 3. I am aware that similar ingredients have been used for this purpose, but when so used, the composition is applied directly to the perforate material and adheres thereto, so that when it is necessary to renew the composition, the metal portion of the diaphragm will necessarily have to be thrown away, thereby entailing a great deal of expense in supplying the diaphragm, as it is necessary to renew the diaphragm at frequent intervals. In my device, however, the composition is applied to an asbestos cloth or similar substance and is supported by the perforated metal or wire gauze, directly in contact with the electrolyte of the cell, so that when it is necessary to renew the diaphragm it can be readily removed and a new diaphragm placed, without interfering with the perforated metal or wire gauze electrode.

In view of the small cost of the ingredients composing the diaphragm, it will be readily apparent that the expense required in producing and renewing the same will be reduced to a minimum, in view of the fact that it is not necessary to renew or destroy the electrode with each renewal of the diaphragm.

What I claim is:—

1. The process for the production of diaphragms for electrolytic cells, comprising the application of a mixture of lime, cement and pulverized asbestos fiber upon a base composed of asbestos cloth, the mixture being caused to permeate the space between the fibers of said cloth and the excess water in said mixture being removed therefrom by suction after said mixture is applied to the cloth, the diaphragm then heated until dry, treated with sodium silicate and tempered in water.

2. The process for constructing a removable composition diaphragm, comprising the application to a strip of asbestos cloth of a composition of lime, cement and asbestos fiber while in a plastic state, the composition being caused to enter the fibers of said cloth and the excess liquids being withdrawn therefrom by suction produced by placing said diaphragm over the top of a closed vessel containing water, and draining the water from said vessel, after which the diaphragm is placed in an oven and dried, treated with sodium silicate and tempered in water, all substantially as herein described.

In testimony whereof I have signed my name to this specification in the presence of two subscribing witnesses.

WILLIAM S. HELTZEN.

Witnesses:
HERBERT A. VERNET,
NORA EVERETT.